Jan. 2, 1951  G. W. GARWIG  2,536,637
DRAWBENCH

Filed June 13, 1945  6 Sheets-Sheet 1

INVENTOR.
GLENN W. GARWIG
BY
Bosworth & Sessions
ATTORNEYS

Jan. 2, 1951 G. W. GARWIG 2,536,637
DRAWBENCH
Filed June 13, 1945 6 Sheets-Sheet 4

INVENTOR.
GLENN W. GARWIG
BY Boswth & Sessions
ATTORNEYS

Jan. 2, 1951  G. W. GARWIG  2,536,637
DRAWBENCH
Filed June 13, 1945 6 Sheets-Sheet 5

INVENTOR.
GLENN W. GARWIG
BY Boswoth + Sessions
ATTORNEYS

Jan. 2, 1951  G. W. GARWIG  2,536,637
DRAWBENCH

Filed June 13, 1945  6 Sheets-Sheet 6

INVENTOR.
GLENN W. GARWIG
BY Bosworth & Sessions
ATTORNEYS

Patented Jan. 2, 1951

2,536,637

UNITED STATES PATENT OFFICE 2,536,637

DRAWBENCH

Glenn W. Garwig, Youngstown, Ohio, assignor to The Aetna-Standard Engineering Company, Youngstown, Ohio, a corporation of Ohio Application June 13, 1945, Serial No. 599,185

8 Claims. (Cl. 205—3)

This invention relates to drawbenches of the type employed in the manufacture of drawn tubes, bars and the like. While the invention will be described herein with reference to a bench particularly adapted to the drawing of tubes, it will be understood that it is also adapted to the manufacture of bars or other articles which can be processed on a drawbench, and such articles are intended to be included when reference is made herein to "tubes."

At the present time, conventional drawbenches ordinarily comprise a bed upon which a carriage provided with gripping jaws is drawn by a heavy chain. A die stand is mounted at one end of the bed, and the tubes are reduced in diameter by being grasped by the jaws on the carriage and pulled through a die mounted in the die stand. At the conclusion of the drawing operation, the carriage is returned to the die stand by a cable or other similar means driven independently of the main chain. In drawbenches of this type the time required for the carriage to return to the die stand after the completion of each drawing operation is wasted. Furthermore, the tube, when released from the die and the carriage, falls downwardly, and skid or discharge arms are ordinarily required in order to convey the tube off of the bench and to prevent the drawn tube from falling onto the chain. These arms and the mechanisms required to move them into and out of discharging operation involve fairly complicated mechanisms and have been a source of trouble in the operation of drawbenches. Also, the main chain and its driving mechanism are expensive, the speed of the carriage fluctuates because of the chain drive, means must be provided for connecting and disconnecting the carriage to the chain, and it is not possible to have the pull exerted by the chain in alignment with the center line of the draw, i. e., the center line of the die.

Accordingly, a general object of the present invention is the provision of a drawbench embodying an improved type of self-propelled carriage in which the designs of the carriage and bench are such that the chain and carriage return cable and their associated drive mechanisms are eliminated. Another object is the provision of a self-propelled carriage arranged so that the driving effort of the carriage is exerted in substantially the same horizontal plane as the center line of the draw, whereby there is no tendency for the carriage to slue or pitch in its travel along the bench. Another object is the provision of a drawbench of improved type in which the need for discharge arms is eliminated, the arrangement being such that the drawn tubes fall directly from the die and the carriage jaws between the tracks of the bed and into bucks or racks arranged to receive them. Another object is the provision of such a drawbench which is entirely open along one side for easy accessibility and to facilitate the removal of drawn tubes. Another object is the provision of an improved type of a drawbench embodying a self-propelled carriage in which the carriage can act to draw tubes in both directions of movement along the bed of the bench.

Other objects include the provision of a drawbench in which a loading rack is disposed above the bed of the drawbench and arranged to supply tubes to be drawn to mandrel loading mechanisms at either end of the drawbench; the provision of a double ended drawbench embodying two sets of mandrel rods and supports of improved design whereby the tubes may be readily loaded upon the mandrel rods with a minimum of effort on the part of the operator and at relatively high speeds; the provision of a self-propelled drawbench carriage in which the center of gravity of the carriage is substantially in alignment with the center line of the drawing operation; the provision of a drawbench in which the carriage is guided by slides in the bed whereby accurate guiding of the carriage is assured; and the provision of a drawbench in which the drawing operation may be carried on at both ends of the bench and in which means are provided for separating tubes drawn in one direction from the tubes drawn in the other direction.

Further objects and advantages of my invention will become apparent from the following description of a preferred form thereof, reference being made to the accompanying drawings. The essential characteristics are summarized in the claims.

Referring now to the drawings.

Figure 1:
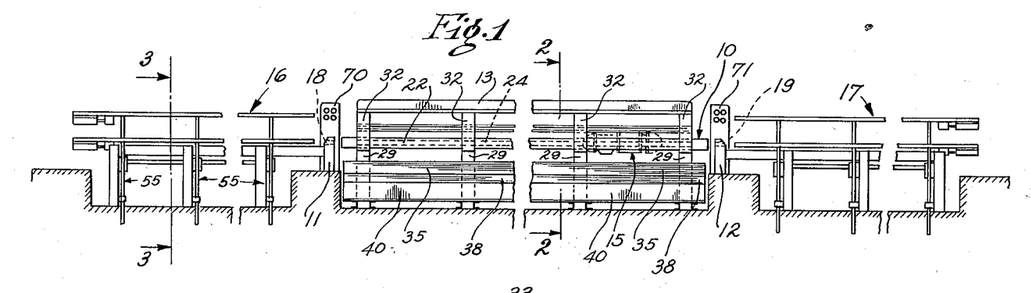
Figure 1 is an elevation of a drawbench made according to a preferred form of my invention.

The general arrangement of a preferred form of double ended drawbench is shown in Figure 1. As there indicated the bench comprises a bed 10, two die stands 11 and 12 at opposite ends of the bed, a loading rack 13 disposed over the bed, carriage 15 operable on the bed and mandrel loading mechanisms indicated generally at 16 and 17 disposed at opposite ends of the bench. The die stands support dies 18 and 19. In the present embodiment the bench is shown as adapted to draw three tubes simultaneously so that three dies are mounted in each die stand. However, it will be understood that one or more dies may be employed, depending upon the nature of the operation being carried out.

Figure 2:
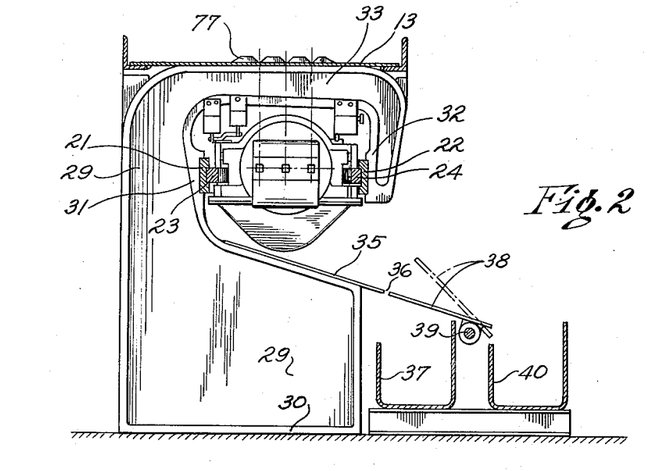
Figure 2 is a transverse section through the drawbench shown in Figure 1 on an enlarged scale, the section being taken along the line 2—2 of Figure 1.

The general arrangement of the bed itself is shown in Figure 2. As there indicated the bed is made up of two longitudinally extending beams 21 and 22 which support track members 23 and 24 on which the carriage 15 operates. The track members 23 and 24 constitute rack bars, being provided with rack teeth 25 and 26 as shown particularly in Figure 10. It will be noted that the toothed faces of the racks are vertical and face each other.

The construction of the carriage and track are described in detail below; for the present it is sufficient to point out that the carriage is provided with a motor which drives pinions engaging the rack teeth 25 and 26, whereby the carriage can be driven along the track in either direction, to draw tubes through the dies carried by either die stand.

Figure 8:
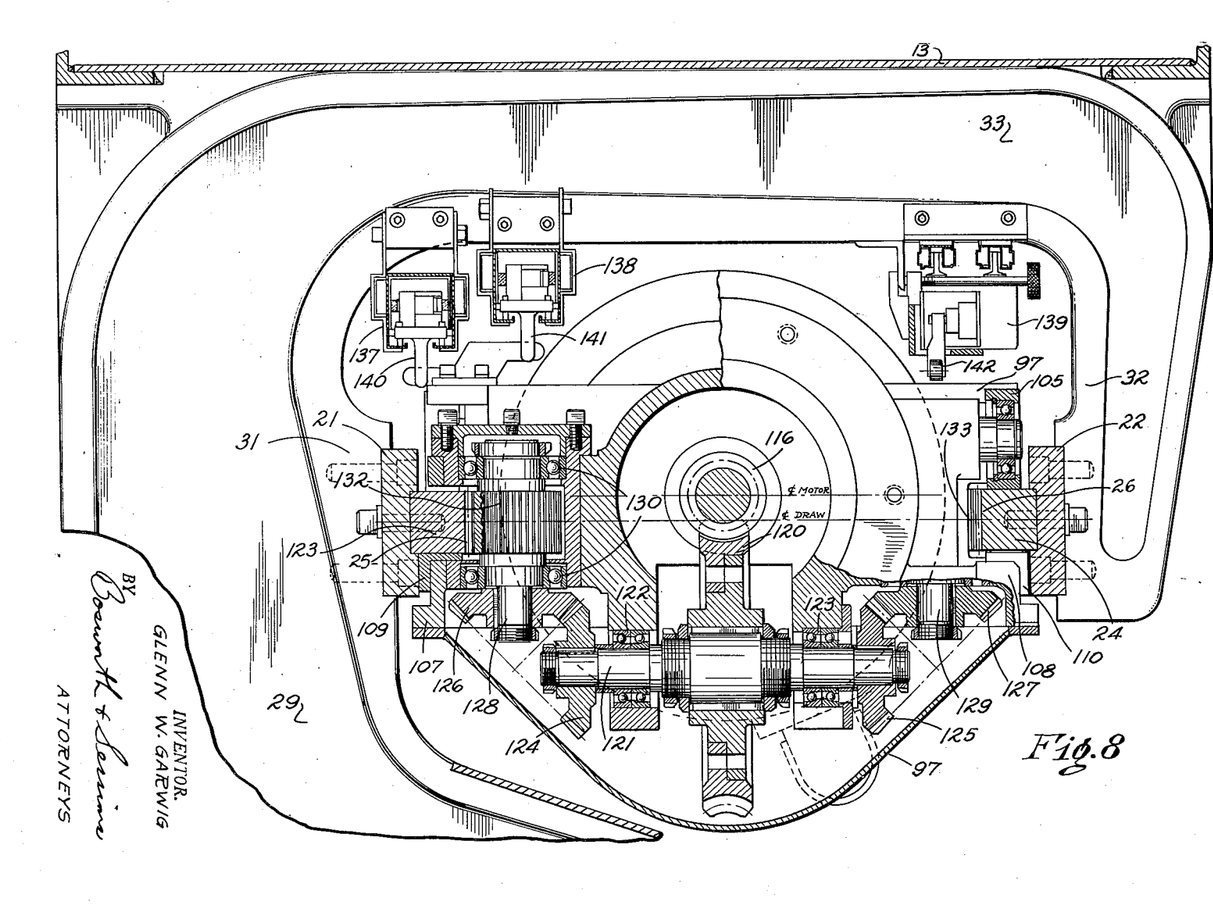
Figure 8 is a transverse sectional view on an enlarged scale showing a preferred form of carriage in position on the bed of the drawbench part of the carriage being broken away to illustrate the drive mechanism thereof.

The beams 21 and 22 which support the track members are themselves supported by the large bracket or frame members 29 spaced along the bed. As shown in Figure 2 these brackets, which may be built up of steel plates welded together or may consist of heavy castings, are provided with base portions 30 extending beneath the track making up the bed of the bench and are generally C-shaped. The beam 21 is supported by the generally vertical portions 31 of the members 29, the members being recessed as shown to receive the beam which may be bolted thereto as shown in Figure 8. The other longitudinal beam member 22 is supported in similar fashion by the downwardly extending portions 32 of the frame members 29, the portions 32 being supported by the horizontal upper portions 33 of frame members. The upper portions are preferably flat on top as shown, providing a convenient support for the loading rack 13. By this arrangement it will be noted that the bed of the drawbench is supported entirely from one side, the space beneath the bed being open at the side opposite the vertical portion 31. As the track members are supported by vertical members on the outside of the tracks, the space between the tracks of the bed is opened and unobstructed; thus tubes discharged from the die and released by the carriage may fall directly through the bed of the bench between the track members and may be discharged to the open side of the bench.

To receive tubes discharged in this manner, I preferably provide sloping guide members 35 on each frame member 29. The guide members 35 carry any tubes falling upon them to the open side of the bench. The members are of sufficient length that tubes falling off their ends 36 of the member 35 will drop into the receiving trough or buck 37. Where it is desired to separate the tubes drawn at one end of the drawbench from tubes drawn at the other end of the drawbench, additional guide members 38 are provided adjacent each guide member 35. These members, which are supported for pivotal movement on a longitudinally extending shaft 39, are arranged so that when they are in the full line position as shown tubes rolling down the guide members 35 will be received by the members 38 and by them conveyed into the receiving trough or buck 40. When the shaft 39 is rotated to move the guide members 38 to the position shown in broken lines, the tubes will merely fall off the ends 36 of the guide members 35 into the receiving trough 37. By this means the tubes drawn at one end of the bench may be readily separated from the tubes drawn at the other end of the bench. The drawn tubes may be removed periodically from the troughs 37 and 40 by any convenient means.

A preferred form of mandrel loading mechanism, whereby the mandrel rods may be loaded with tubes and the tubes fed to proper position adjacent the die stand, is illustrated particularly in Figures 3 to 7, inclusive. Reference is hereby made to the application of Donald V. Strock, Serial No. 662,126, filed April 15, 1946, and owned by the assignee of this application, which contains claims directed to the mandrel loading mechanism disclosed herein. Mandrel loading mechanisms of the type disclosed in the copending application of William Rodder, Serial No. 540,630, filed June 16, 1944, now Patent No. 2,472,231, granted June 7, 1949, may also be employed advantageously with drawbenches embodying the present invention. Inasmuch as the mandrel loading mechanisms 16 and 17 at opposite ends of the bench are preferably identical, except that they are of opposite hand, only the mandrel loading mechanism 16 will be described in detail herein.

Figure 3:
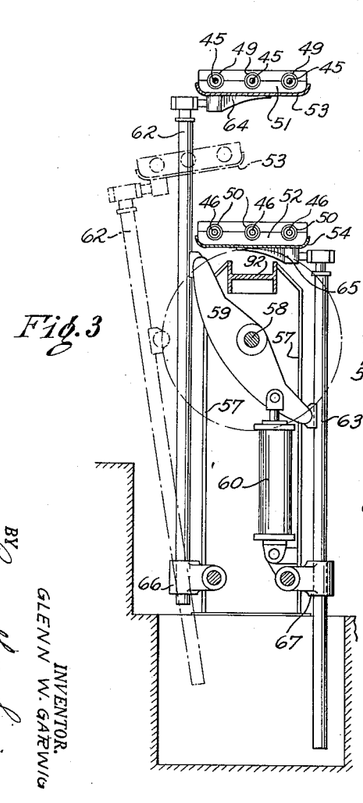
Figure 3 is a section through the mandrel rod operating mechanism, the section being taken along the line 3—3 of Figure 1.
Figure 4:
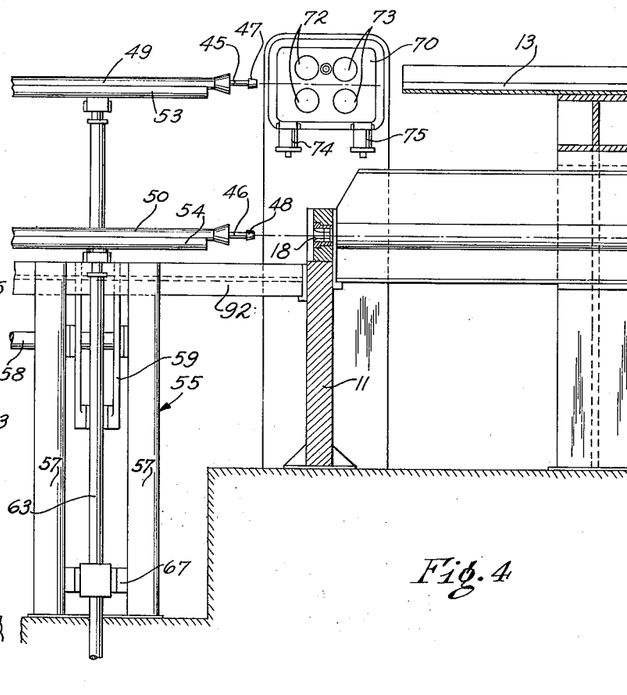
Figure 4 is an elevational detail on an enlarged scale through the parts of the drawbench adjacent the die stand.

As shown in Figures 3 and 4, two sets of mandrel rods are employed, each set in the present embodiment comprising three mandrel rods inasmuch as the drawbench shown is designed for the simultaneous drawing of three tubes. The upper set of rods 45 is shown in loading position with the rods in substantially the same plane as the loading rack 13; the lower set of rods 46 is in alignment with the dies 18 carried by the die stand 11. The rods 45 and 46 are provided with the usual plugs or mandrels 47 and 48, respectively, and during the drawing operation the rods of the lower set are advanced toward the die stand so that the mandrels are positioned closely adjacent the dies in accordance with customary practice. The rods 45 are disposed in supporting tubes 49, and the rods 46 are disposed in similar supporting tubes 50. These in turn are carried by grooved guide blocks 51 and 52, respectively, which are mounted on longitudinally extending platforms 53 and 54.

The mandrel rods, tubes, guide blocks and the platforms are supported by longitudinally spaced mechanisms indicated in general by reference characters 55 and arranged to interchange the position of mandrel rods 45 and associated parts with mandrel rods 46 and associated parts so that one set of mandrel rods can be loaded with tubes while the tubes carried by the other set are being drawn through the dies; as soon as the drawing operation is completed, the position of the mandrel rods may be interchanged, the loaded mandrel rods being lowered to drawing position while the other set of mandrel rods is raised to loading position in alignment with the loading platform 13.

To accomplish this movement each mechanism 55 comprises a suitable supporting frame built up of members 57, and through which a longitudinal shaft 58 extends. A lever 59 is mounted on the shaft 58 between members 57, and is arranged to be rocked through about 120° of arc as by the fluid pressure cylinder actuating mechanism 60. Inasmuch as each of the mechanisms 55 is interconnected by the shaft 58 only one cylinder 60 is required, this cylinder preferably being installed in a mechanism 55 about mid-way between the ends of the entire loading mechanism 16. Supporting rod members 62 and 63 are pivotally attached to opposite ends of the lever 59; these carry brackets 64 and 65 which in turn support the platforms 53 and 54, respectively. The lower portions of the rods 62 and 63 are slideably supported in guide members 66 and 67 which are pivotally mounted upon the frame members 57.

With this arrangement rocking of the lever 59 from the position shown in full lines in Figure 3 of the drawings to the position shown in broken lines will interchange mandrel rods 45 and 46. While the mandrel rods are supported directly above one another in their drawing and loading positions, the action of the lever 59, the rods 62 and 63 and the pivoted guides 66 and 67 causes the mandrel rods to take an arcuate path in their travel from one position to the other so that the supporting platforms 53 and 54 will clear each other in their travel between the two positions. The manner in which the platforms and mandrel rods are swung away from the vertical center line of the apparatus is illustrated by the position of the supporting rod 62, platform 53 and associated parts shown in broken lines in Figure 3. The other group of mandrel rods and associated mechanism takes a corresponding position to the right of the vertical center line of the mechanism at the same time with the result that there is ample clearance to permit these parts to pass each other without interference.

It will be noted that the platforms 53 and 54 are tilted only slightly from the horizontal in their travel from one position to the other, substantially the extreme amount of tilt being shown in the broken line position in Figure 3. Thus, troughs instead of tubes may be used to support the mandrel rods, if desired. Also, it is to be noted that the dimensions of each of the mechanisms 55 are preferably identical, which not only makes for economy of manufacture, but insures that the mandrel rods themselves will remain substantially horizontal at all times and enables the mandrel rods to be disposed in a horizontal position while being loaded. By this arrangement, a single horizontal loading rack 13, as shown in Figures 1 and 4, can be used to supply tubes to the two mandrel loading mechanisms 16 and 17.

In order to facilitate feeding the tubes over the mandrel rods, pinch roll mechanisms 70 and 71 (see Figure 1) are disposed above the die stands at each end of the drawbench. These mechanisms may be substantially identical, and as shown in Figure 4, may comprise two sets of pinch rolls 72 and 73 driven by a suitable electric motor (not shown) and provided with air or hydraulic cylinders 74 and 75 to urge them toward each other to enable them to grasp tubes and feed them over the mandrels. If desired, guide blocks such as shown at 77 (Figure 2) may be mounted adjacent the ends of the loading platform 13 to facilitate the alignment of the tubes with the mandrel rods.

Figures 5, 6, 7:
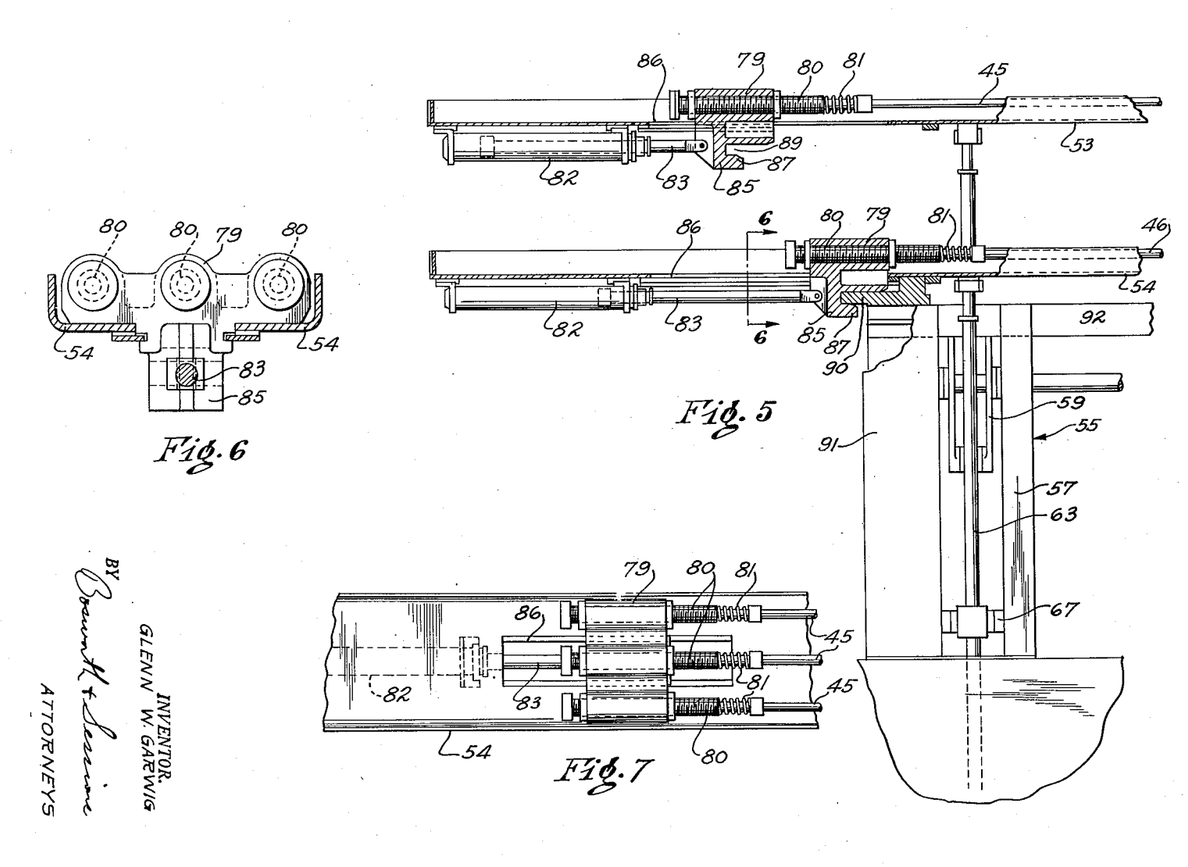
Figure 5 is another elevational detail on an enlarged scale showing the mandrel rod operating mechanism at the left hand end of the drawbench.
Figure 6 is a section through the mandrel rod operating mechanism taken along the line 6—6 of Figure 5.
Figure 7 is a fragmentary plan view of the mandrel rod anchors and operating mechanism shown in Figure 5.

The mechanism for anchoring the mandrel rods is illustrated particularly in Figures 5, 6 and 7. This includes a block 79 for each group of mandrel rods in which supporting and adjusting screws 80 are adjustably mounted. The rods are urged forward for the limit of their movement by springs 81 in more or less conventional manner, and the blocks 79 are slideably supported on the platforms 53 and 54 so that they may be advanced and retracted by the fluid pressure cylinders 82. The piston rods 83 are connected to depending portions 85 of the blocks 79 which extend downwardly through slots 86 in the platform members. Thus by reciprocation of the pistons within the cylinders, the blocks 79 may be reciprocated to move the mandrel rods 45 or 46 toward or away from the die stand.

The depending portions 85 of the blocks 79 are provided with forwardly extending portions 87 which form a groove or recess 89 beneath the blocks, the recess being adapted to receive anchor member 90 mounted on the frame member 91 adjacent the last of the elevating mechanisms 55. Thus the block 79 associated with the set of mandrel rods which is in drawing position firmly interlocks with the anchor member, furnishing a secure anchor to accurately locate the mandrel rods, as shown in the lower portion of Figure 5. In Figure 7, the block 79 is shown in a position about midway between the anchoring position and the fully retracted position. It will be noted that there is a longitudinal member secured to the frame member 91 and to the several frame members 57 of the mechanisms 55, and extending to the die stand 11 to take the thrust exerted on the mandrel rods.

In operation the lower cylinder 82 is actuated to retract the mandrel rods and disengage the lower block 79 from the locking lug or anchor 90, then the cylinder 60 is actuated to rock the levers 59 of the several mechanisms 55 and interchange the positions of the two sets of mandrel rods. The cylinder 82 which is associated with the then lower set of mandrel rods is next actuated in the opposite direction to advance the lower set of rods to drawing position adjacent the die stand and to interlock the lower block 79 with the anchor 90. If desired, the upper cylinder 82 may also be actuated to move the upper set of mandrel rods to a position closely adjacent the pinch rolls, but ordinarily the upper rods will be left in retracted position as shown in Figure 5. The cylinders 82 for advancing and retracting the mandrel rods and the cylinders 60 may be controlled by the operator through conventional electric controls and solenoid valves, suitable interconnections being provided so that the cylinder 60 cannot be actuated as long as the lower block 79 is interlocked with the anchor 90. By this mechanism the tubes to be drawn may be readily loaded upon the mandrel rods, and loaded mandrel rods positioned adjacent the die stand with no substantial loss of time.

Figure 9:
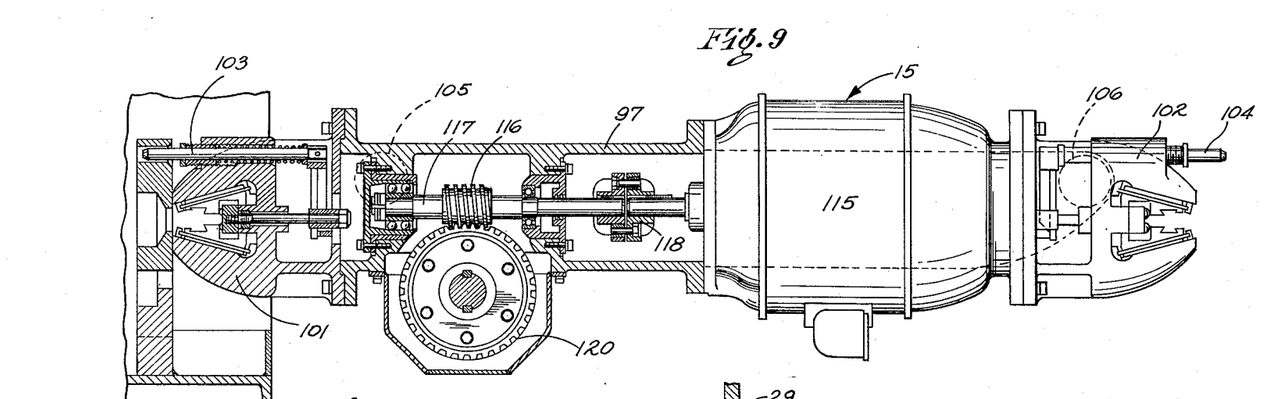
Figure 9 is a side elevation partially in section of the carriage of Figure 8.
Figure 10:
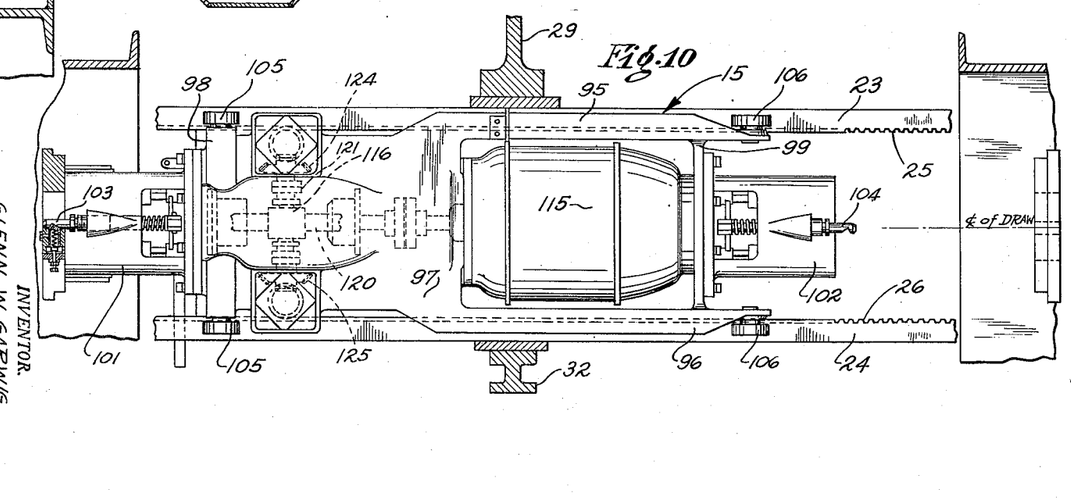
Figure 10 is a plan view of the carriage of Figure 8.

A preferred form of carriage 15 for drawing tubes through the dies carried by the die stand is illustrated in Figures 8, 9 and 10. As shown particularly in Figure 10, the carriage comprises a frame made up of two longitudinally extending members 95 and 96, a housing portion 97 and transverse members 98 and 99 to which the gripper jaw assemblies 101 and 102 are bolted. The jaw assemblies and associated mechanisms may be of conventional construction and will not be described in detail herein. Inasmuch as the bench is shown as being provided with three dies in each die stand, each gripper jaw assembly includes three jaws. The gripping mechanisms are actuated by the plungers 103 and 104, respectively, which are adapted to engage within recesses in the die stand as shown particularly at the left hand end of Figure 9.

The carriage is supported by oppositely disposed pairs of wheels 105 and 106 which engage the upper surfaces of the track members 23 and 24. The carriage is also guided in its movement along the track by slide members 107 and 108 (see Figure 8) which engage longitudinally extending angles 109 and 110 secured to the underside of the track members 23 and 24. The materials of which the parts 107, 108 and 109, 110 are composed are selected for the desired friction characteristics, for example, steel and brass or bronze may be employed, and as the angle guide members 109, 110 are on the bottom of the track they will remain free from dirt and the like. By the presence of these guides, the carriage is prevented from rocking or oscillating about either a horizontal or vertical axis, and thus straight line motion of the carriage along the bed is assured, resulting in accurate and uniform drawing of the tubes.

The carriage is driven along the bed to draw the tubes by means of a motor 115, secured to the housing member 97 and arranged to drive a worm 116 mounted on shaft 117 through a flexible coupling 118. The worm 116 in turn drives the worm wheel 120 which is mounted on a transverse shaft 121 supported by suitable bearings 122 and 123 disposed in the lower part of the housing 97. The shaft 121 is provided at its ends with beveled gears 124 and 125 which engage beveled gears 126 and 127, respectively, mounted at the lower ends of shafts 128 and 129. The shaft 128 extends vertically upwardly and is supported in the housing 97 by suitable bearings 130. The shaft 129 is similarly mounted and is identical in all material respects with the shaft 128, but the bearings for the shaft 129 do not show in Figure 8 of the drawings.

Between their supporting bearings, shafts 128 and 129 are provided with driving pinions 132 and 133. The teeth of these pinions engage the teeth 25 and 26 of the track members 23 and 24, respectively. Thus operation of the motor 115 will result in rotation of the shafts 128 and 129 and their associated pinions 132 and 133 in opposite directions, resulting in movement of the carriage along the bench. The direction of movement of the carriage may be reversed merely by reversing the direction of rotation of the motor.

Electric power is supplied to the motor 115 by longitudinally extending trolley ducts 137 and 138 which are engaged by trolleys 140 and 141, respectively, mounted on the housing 97 as shown particularly in Figure 8. A control system indicated at 139 and 142 may also be provided automatically to stop the carriage as it approaches either die stand. The construction of the ducts, trolleys and controls may be conventional and will not be described in detail here. Suitable conductors lead from the trolleys to the motor, and the assembly may be provided with any convenient type of manual and such additional automatic controls as may be necessary or desirable.

It will be noted that the drive arrangement provides a speed reduction between the motor and the drive pinions and permits the motor to be mounted in a horizontal position with its axis extending longitudinally of the bench and disposed between the longitudinal frame members 95 and 96. Thus the motor may be mounted low on the carriage with the result that the center of gravity of the carriage substantially coincides with the center line of the draw. Also, the horizontal center lines of the pinions 132 and 133 lie in the horizontal plane of the center line of the draw, and the pinions are equally spaced on either side of the central vertical plane of the draw. These features, in combination with the accurate guiding of the carriage along the bench and the uniform motion provided by the worm and rack and pinion drive, insures a steady and straight travel of the carriage along the tracks, the arrangement being such that all side and vertical thrusts of the carriage against the track due to the drawing operation are substantially eliminated. Furthermore, the thrusts of the pinions transversely of the rack are in opposite directions and therefore balanced. Thus any movements of the carriage which might cause irregularities in the drawing operation or chattering of the carriage in its travel along the bed are prevented, primarily by the elimination of any forces which might cause such undesired effects.

Figure 11:
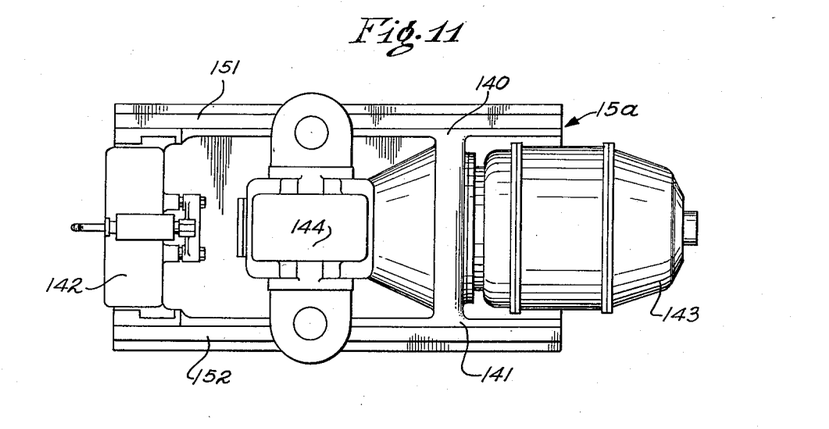
Figures 11, 12 and 13 are plan, elevational and transverse sectional views, respectively, of a modified form of carriage.
Figure 12:
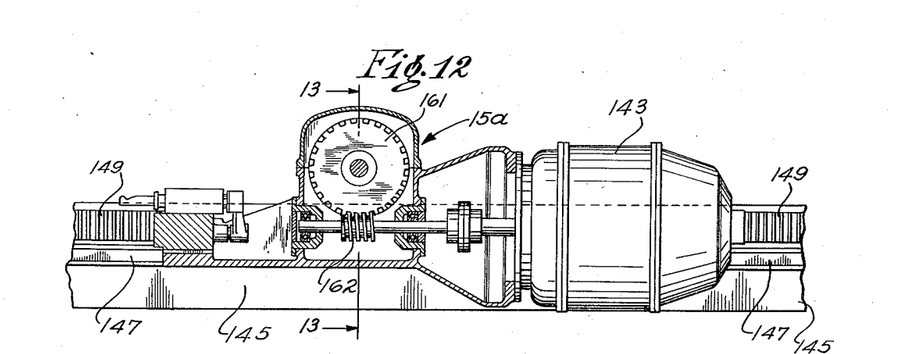
Figure 13:
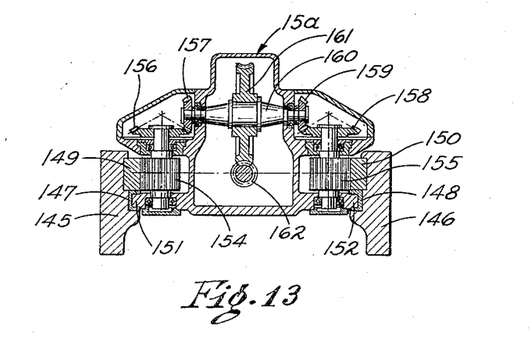

A modified form of carriage indicated in general at 15a is shown in Figures 11, 12 and 13. This carriage is modified in two principal respects in that it is provided with only a single set of gripping jaws and in that it is arranged to be slideably mounted on a slightly modified form of track, no rollers being provided. Those skilled in the art will appreciate that carriages of this type may be provided with two sets of gripper jaws, if desired, or the previously described type of carriage may be provided with only a single set of jaws when used with a single-ended drawbench. Obviously, only one mandrel loading mechanism will be employed when the bench includes a die stand at only one end thereof.

As shown in Figure 11, the carriage 15a comprises a frame made up of two longitudinally extending members 140 and 141 and suitable transverse members which support the gripper jaws 142, the motor 143 and the housing 144 within which the gear driving mechanism is disposed. Power may be supplied to the motor by suitable conductors and trolleys as described in connection with the previous modification. As before, the jaw mechanisms may be of conventional construction embodying three jaws to correspond to the three dies carried by the die stand. In this modification the track is also changed slightly, the longitudinal members 145 and 146 (see Figure 13), which are supported by means such as the frame members 29 described in connection with the previous modification, being provided with guides 147 and 148 disposed immediately beneath the rack bars 149 and 150.

In order to support the carriage for movement along the tracks 145 and 146, the longitudinal frame portions 140 and 141 are formed with projecting flanges 151 and 152 which constitute slides engaging within the guides 147 and 148. Because of the substantial length of the longitudinal frame members ample area of contact between the guides and the slides is obtained so that the unit pressures are not excessive. Also the length of the engagement between the carriage and the guides insures that the carriage will travel in a straight line without any tendency to yaw or oscillate in its travel along the bench. As before, the center line of the gripping jaws and the center line of the draw substantially coincide and are only a slight distance above the plane of the guides 147 and 148, and the driving effort of the carriage is exerted on the rack bars substantially in the common horizontal plane of the center lines of the several dies.

The carriage is driven by vertical pinions 154 and 155 engaging the rack bars 149 and 150, respectively. The pinions are mounted on shafts in suitable bearings carried by the housing 144 and are driven through beveled gears 156 and 157, and 158 and 159, respectively, by means of the horizontal shaft 160 which in turn is driven by the motor 143 through the worm wheel 161 and worm 162, the various gears being appropriately supported within the gear box or housing 144. This arrangement provides a suitable speed reduction between the motor and the pinions 154 and 155 and enables the motor to be mounted in horizontal position with its axis extending longitudinally of the frame and disposed between the longitudinal frame members 140 and 141. Thus the center of gravity of the carriage substantially coincides with the center line of the draw, and the design is such as to eliminate substantially all side or vertical thrust of the carriage against the guide members and substantially all forces which might cause irregularities in the drawing operation or chattering of the carriage in its travel along the bed.

In operation of the form of the apparatus first described, the operator positions a loaded set of mandrel rods adjacent one of the die stands, for example the die stand 11, and feeds the pointed ends of the tubes through the dies carried by the die stand; then the carriage is advanced adjacent the die stand, the gripper jaws 101 engage the projected ends of the tubes, and the carriage is operated in a direction away from the die stand (to the right in the drawing in the example given) to draw the tubes through the dies. While the drawing operation is going on, the upper set of mandrel rods in the mandrel mechanism 16 are loaded with tubes. The mandrel rods of the mandrel loading mechanism 17 are also loaded with tubes, one group of tubes are positioned in alignment with the dies 19 carried by the die stand 12, the pointed ends of the tubes being fed through the dies 19 in position to be grasped by the gripper jaws 102 of the carriage 15. When the drawing operation through the dies 18 is completed, the tubes are automatically disengaged or released by the gripper jaws 101, fall downwardly between the track members 23 and 24 onto the guides 35 and 36 and thence into the receiving trough or buck 40. The carriage continues on to a position adjacent the die stand 12 where it is operated to engage the pointed ends of the tubes project- ing through the dies 19; then the carriage is operated in reverse direction (to the left in the example given) to draw the tubes through the dies 19. While this drawing operation is going on, the upper sets of mandrel rods in loading mechanisms 17 are loaded with tubes, and the position of the mandrel rods in mechanism 16 are interchanged to bring the loaded mandrel rods into position adjacent the die stand so that the tubes may be projected through the dies and the cycle of operations repeated. By this arrangement lost time is substantially eliminated, the production of the drawbench may be increased to almost twice the production of a conventional drawbench with a commensurate saving in production cost. Because of the uniform straight line movement of the carriage, the drawing operation is carried out uniformly, with rapid production of tubes of the desired characteristics throughout.

The operation of the bench with a single ended carriage is the same except that the carriage is returned to the die stand after each drawing operation without acting to draw any tubes. The loaded mandrel rods are positioned adjacent the die stand while the carriage is on its return trip and the empty mandrel rods in the upper position are loaded with tubes during the drawing operation. In both forms of the invention, the controls are preferably centralized to enable the operator to manipulate the mandrel loading mechanisms and control the movement of the carriage from a single station.

From the foregoing description of preferred forms of my invention, it will be evident that I have provided an efficient type of drawbench which can be operated to draw tubes and the like at a high rate of speed. The elimination of the chain and the carriage return cables incorporated in the conventional types of drawbenches simplifies the structure considerably and eliminates the variations in speed which are inevitable with chain driven benches. The application of power is more efficient because it is applied directly at the carriage and in line with the center line of the draw. The elimination of the chain also makes possible the use of an open drawbench, permitting the drawn tubes to fall directly from the die and the carriage jaws onto guide members which guide the tubes into receiving bucks, thus obviating the necessity for providing discharge arms and associated mechanisms for conveying the tubes away from the path of the carriage. The construction is such that the drawbench is open along one entire side for accessibility and ease of discharge of drawn tubes. The mandrel loading mechanisms operate rapidly and are arranged so that the tubes are horizontal at all times, making it possible for tubes to be loaded onto mandrel rods at opposite ends of the bench from a single horizontal loading platform. All of these features contribute to the efficiency of operation of the drawbench.

Those skilled in the art will appreciate that various changes and modifications may be made in the apparatus described herein without departing from the spirit and scope of my invention. Therefore, it is to be understood that my patent is not limited to the preferred forms described in detail herein or in any manner other than by the scope of the appended claims.

I claim:

1. In a drawbench, two spaced horizontally extending racks the operating faces of which are vertical and face in opposite directions, the center lines of said racks being disposed in substantially the same horizontal plane as the line of draw; a self-propelled carriage, the thrust for driving the carriage being exerted in substantially the same horizontal plane as the line of draw; pinions mounted on the carriage for rotation about vertical axes, said pinions being in engagement with said racks; and an electric motor mounted on the carriage for driving said pinions.

2. A drawbench according to claim 1 wherein the carriage comprises two longitudinally extending frame members between which the motor is supported, the axis of the motor extending longitudinally of the carriage and being disposed near the line of draw, whereby the center of gravity of said carriage substantially coincides with the line of draw.

3. A drawbench according to claim 1 wherein the upper surfaces of the racks supporting the carriage and guides are provided adjacent the lower surfaces of the racks, the carriage having wheels engaging the upper surfaces of the racks and slides engaging the guides disposed adjacent the lower surfaces of the racks.

4. A drawbench according to claim 1 wherein the racks are provided with channel section guides disposed below the teeth, the carriage having slides engaging within said channels and supporting said carriage on said racks.

5. In a drawbench, two spaced horizontally extending track members, two spaced horizontally extending racks, the toothed faces of the racks being vertical, and a self-propelled carriage movable on said track members, said carriage having an electric motor with its shaft extending longitudinally of the carriage, a worm driven by the motor shaft, a worm wheel driven by the worm and mounted on a transversely extending shaft, beveled gears at opposite ends of said transversely extending shaft and vertical shafts carrying beveled gears driven by said beveled gears on said transversely extending shaft, said vertical shafts extending from said transversely extending shaft at opposite sides of the carriage and being provided with pinions mounted on vertical axes and engaging said racks for propelling said carriage along said track members.

6. In a drawbench, two spaced horizontally extending track members, two spaced horizontally extending racks having vertical operating faces forming part of said track members, and a self-propelled carriage movable on said track members, said carriage having an electric motor with its shaft extending longitudinally of the carriage, vertical shafts at opposite sides of the carriage provided with pinions engaging said racks for propelling said carriage along said track members, and gear means for making a driving connection between the shaft of said motor and said vertical shafts.

7. In a drawbench, two spaced horizontally extending track members, two spaced horizontally extending racks having vertical operating faces forming part of said track members, and a self-propelled carriage movable on said track members, said carriage having an electric motor with its shaft extending longitudinally of the carriage, said motor being disposed with its shaft at substantially the level of said track members, pinions at opposite sides of the carriage engaging said racks for propelling said carriage along said track members, and means for making a driving connection between the shaft of said motor and said pinions.

8. In a drawbench, a horizontally extending frame; horizontally extending tracks on the frame; a horizontal loading rack immediately above the frame; mandrel rod mechanisms at each end of the loading rack, each of said mandrel rod mechanisms being movable between a horizontal loading position in alignment with its end of the loading rack and a horizontal drawing position in alignment with the tracks on the frame; and a carriage movable on said tracks cooperating alternately first with one and then with the other of the two mandrel rod mechanisms, said carriage drawing in a given direction from one of said mandrel rod mechanisms and in the opposite direction from the other of said mandrel rod mechanisms.

GLENN W. GARWIG.

REFERENCES CITED

The following references are of record in the file of this patent:

UNITED STATES PATENTS

| Number | Name | Date |
|---|---|---|
| 981,304 | Perry | Jan. 10, 1911 |
| 1,132,531 | Webster | Mar. 16, 1915 |
| 1,388,905 | Taylor | Aug. 30, 1921 |
| 1,765,047 | Belles | June 17, 1930 |
| 1,812,359 | Moltrup | June 30, 1931 |
| 1,870,419 | Palmer | Aug. 9, 1932 |
| 2,196,155 | Smith | Apr. 2, 1940 |
| 2,331,953 | Andrews | Oct. 19, 1943 |
| 2,367,793 | McIlvried | Jan. 23, 1945 |
| 2,391,908 | Knudsen | Jan. 1, 1946 |